(12) United States Patent
Kobayashi et al.

(10) Patent No.: US 11,852,792 B2
(45) Date of Patent: *Dec. 26, 2023

(54) SAMPLE OBSERVATION DEVICE

(71) Applicant: HAMAMATSU PHOTONICS K.K., Hamamatsu (JP)

(72) Inventors: Masanori Kobayashi, Hamamatsu (JP); Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 567 days.

This patent is subject to a terminal disclaimer.

(21) Appl. No.: 16/981,969

(22) PCT Filed: Jan. 10, 2019

(86) PCT No.: PCT/JP2019/000520
§ 371 (c)(1),
(2) Date: Sep. 17, 2020

(87) PCT Pub. No.: WO2019/198283
PCT Pub. Date: Oct. 17, 2019

(65) Prior Publication Data
US 2021/0116692 A1     Apr. 22, 2021

(30) Foreign Application Priority Data
Apr. 9, 2018   (JP) .................................. 2018-074871

(51) Int. Cl.
*G02B 21/06* (2006.01)
*G02B 21/00* (2006.01)

(52) U.S. Cl.
CPC ....... *G02B 21/0052* (2013.01); *G02B 21/008* (2013.01); *G02B 21/06* (2013.01)

(58) Field of Classification Search
CPC ................ G02B 21/00; G02B 21/0004; G02B 21/0016; G02B 21/002; G02B 21/0024;
(Continued)

(56) References Cited

U.S. PATENT DOCUMENTS 8,059,336 B2 * 11/2011 Ptitsyn ..................... G01B 9/04
359/383
9,198,321 B1 * 11/2015 Heydari ............... H05K 7/1495
(Continued)

FOREIGN PATENT DOCUMENTS

| CN | 105378537 A | 3/2016 |
| CN | 105474067 A | 4/2016 |

(Continued)

OTHER PUBLICATIONS

International Preliminary Report on Patentability dated Oct. 22, 2020 for PCT/JP2019/000520.

*Primary Examiner* — Thong Q Nguyen
(74) *Attorney, Agent, or Firm* — Faegre Drinker Biddle & Reath LLP

(57) ABSTRACT

A sample observation device includes: an emission optical system that emits planar light to a sample; a scanning unit that scans the sample in one direction so as to pass through an emission surface of the planar light; an imaging optical system that has an observation axis inclined with respect to the emission surface and forms an image of observation light generated in the sample by emission of the planar light; an image acquisition unit that acquires image data corresponding to an optical image of the observation light formed by the imaging optical system; and an image generation unit that generates observation image data of the sample based on the image data acquired by the image acquisition unit. The imaging optical system has a non-axisymmetric optical element that bends a light beam on one axis of the obser- (Continued)

vation light but does not bend a light beam on the other axis perpendicular to the one axis.

11 Claims, 18 Drawing Sheets

(58) Field of Classification Search
CPC ............ G02B 21/0032; G02B 21/0036; G02B 21/0052; G02B 21/008; G02B 21/06; G02B 21/26; G02B 21/361; G02B 21/365; G02B 21/367
USPC .................................................. 359/368–390
See application file for complete search history.

(56) References Cited

U.S. PATENT DOCUMENTS

| | | | |
|---|---|---|---|
| 10,809,509 B2 * | 10/2020 | Yamamoto | G01N 21/64 |
| 11,131,839 B2 * | 9/2021 | Yamamoto | G02B 21/0032 |
| 11,391,934 B2 * | 7/2022 | Yamamoto | G02B 21/36 |
| 2015/0057127 A1 * | 2/2015 | Lagree | A63B 21/00069 |
| | | | 482/142 |
| 2015/0286042 A1 | 10/2015 | Hilbert et al. | |
| 2016/0139394 A1 | 5/2016 | Taniguchi et al. | |
| 2016/0241758 A1 | 8/2016 | Dohi et al. | |
| 2016/0291304 A1 | 10/2016 | Singer et al. | |
| 2016/0349495 A1 | 12/2016 | Pretorius | |
| 2017/0038575 A1 | 2/2017 | Pretorius | |
| 2018/0363904 A1 * | 12/2018 | Hird | F23R 3/286 |

FOREIGN PATENT DOCUMENTS

| | | |
|---|---|---|
| DE | 10 2011 051 042 A1 * | 12/2012 |
| JP | S62-180241 A | 8/1987 |
| JP | 2000-090247 A | 3/2000 |
| JP | 2014-202967 A | 10/2014 |
| JP | 2016-525228 A | 8/2016 |
| JP | 2016-525229 A | 8/2016 |
| JP | 2016-535861 A | 11/2016 |
| JP | 2016-537670 A | 12/2016 |
| JP | 2016-537671 A | 12/2016 |
| JP | 2017-501429 A | 1/2017 |
| JP | 2017-513063 A | 5/2017 |
| WO | WO 2014/202704 A1 | 12/2014 |
| WO | WO-2015/004107 A1 | 1/2015 |
| WO | WO-2015/004108 A1 | 1/2015 |
| WO | WO-2015/071361 A1 | 5/2015 |
| WO | WO-2015/071362 A1 | 5/2015 |
| WO | WO-2015/071363 A1 | 5/2015 |
| WO | WO-2015/155027 A1 | 10/2015 |

\* cited by examiner (A)

(B)

(A)

(B)

(A)

(B)

SAMPLE OBSERVATION DEVICE

TECHNICAL FIELD

The present disclosure relates to a sample observation device.

BACKGROUND ART

SPIM (Selective Plane Illumination Microscopy) is known as one of the methods for observing the inside of a sample having a three-dimensional structure, such as a cell. For example, in a tomographic image observation device described in Patent Literature 1, the basic principle of the SPIM is disclosed. In this device, planar light is emitted to a sample, and an image of fluorescence or scattered light generated inside the sample is formed on the image forming surface to acquire observation image data of the inside of the sample.

As another sample observation device using planar light, for example, an SPIM microscope described in Patent Literature 2 can be mentioned. In the conventional SPIM microscope, observation light from the sample is imaged by the observation optical system that emits planar light having a predetermined inclination angle to the sample arrangement surface and has an observation axis perpendicular to the emission surface of the planar light.

CITATION LIST

Patent Literature

Patent Literature 1: Japanese Unexamined Patent Publication No. S62-180241
Patent Literature 2: Japanese Unexamined Patent Publication No. 2014-202967

Technical Problem

As in Patent Literature 2 described above, in the configuration in which each of the emission optical system and the observation optical system is inclined with respect to the sample arrangement surface, the influence of the astigmatism of observation light can be considered. In order to reduce the influence of astigmatism, Patent Literature 2 proposes to observe a sample with an immersion objective lens using a sample placement portion having a refractive index similar to that of water. However, with such a configuration, it is difficult to observe a sample while scanning the sample, so that there is a possibility that the throughput until observation image data is obtained will be reduced.

SUMMARY OF INVENTION

The present disclosure has been made to solve the aforementioned problem, and it is an object of the present disclosure to provide a sample observation device capable of reducing the astigmatism of observation light.

Solution to Problem

A sample observation device according to an aspect of the present disclosure includes: an emission optical system that emits planar light to a sample; a scanning unit that scans the sample in one direction so as to pass through an emission surface of the planar light; an imaging optical system that has an observation axis inclined with respect to the emission surface and forms an image of observation light generated in the sample by emission of the planar light; an image acquisition unit that acquires image data corresponding to an optical image of the observation light formed by the imaging optical system; and an image generation unit that generates observation image data of the sample based on the image data acquired by the image acquisition unit. The imaging optical system has a non-axisymmetric optical element that bends a light beam on one axis of the observation light but does not bend a light beam on the other axis.

In this sample observation device, the imaging optical system has a non-axisymmetric optical element that bends a light beam on one axis of the observation light but does not bend a light beam on the other axis. Therefore, even when the observation axis of the imaging optical system is inclined with respect to the emission surface of the planar light, it is possible to reduce the astigmatism of the observation light in the imaging optical system, and it is possible to improve the image quality.

The optical element may be a wedge prism. In this case, a non-axisymmetric optical element can be appropriately constructed.

The optical element may be a cylindrical lens. In this case, a non-axisymmetric optical element can be appropriately constructed.

The imaging optical system may include an objective lens, and the optical element may be arranged between the emission surface and the objective lens. By arranging the optical element between the emission surface and the objective lens, the above-described operational effect is appropriately achieved.

The imaging optical system may include an objective lens, and the optical element may be arranged between the objective lens and the image acquisition unit. When the optical element is arranged at this position, the optical element is less likely to interfere with other components, so that the imaging optical system can be easily configured.

The imaging optical system may include an objective lens and an imaging lens, and the optical element may be arranged between the imaging lens and the image acquisition unit. When the optical element is arranged at this position, the optical element is less likely to interfere with other components, so that the imaging optical system can be easily configured.

The imaging optical system may include an objective lens and an imaging lens, and the optical element may be arranged between the objective lens and the imaging lens. When an infinity correction optical system is configured by the objective lens and the imaging lens, the same operational effect as that described above is appropriately achieved by arranging the optical element between the objective lens and the imaging lens.

An inclination angle of the observation axis of the imaging optical system with respect to the emission surface of the planar light may be 10° to 80°. In this range, the resolution of the observed image can be sufficiently secured.

An inclination angle of the observation axis of the imaging optical system with respect to the emission surface of the planar light may be 20° to 70°. In this range, the resolution of the observed image can be more sufficiently secured. In addition, since it is possible to suppress the change of the field of view with respect to the angle change amount of the observation axis, it is possible to secure the stability of the field of view.

An inclination angle of the observation axis of the imaging optical system with respect to the emission surface of the planar light may be 30° to 65°. In this range, the resolution of the observed image and the stability of the field of view can be more preferably secured.

The sample observation device may further include an analysis unit that analyzes the observation image data and generates an analysis result. Since the observation image data generated by the image generation unit is analyzed by the analysis unit, the analysis throughput can also be improved.

Advantageous Effects of Invention

According to the present disclosure, it is possible to reduce the astigmatism of observation light.

DESCRIPTION OF EMBODIMENTS

Figure 1:
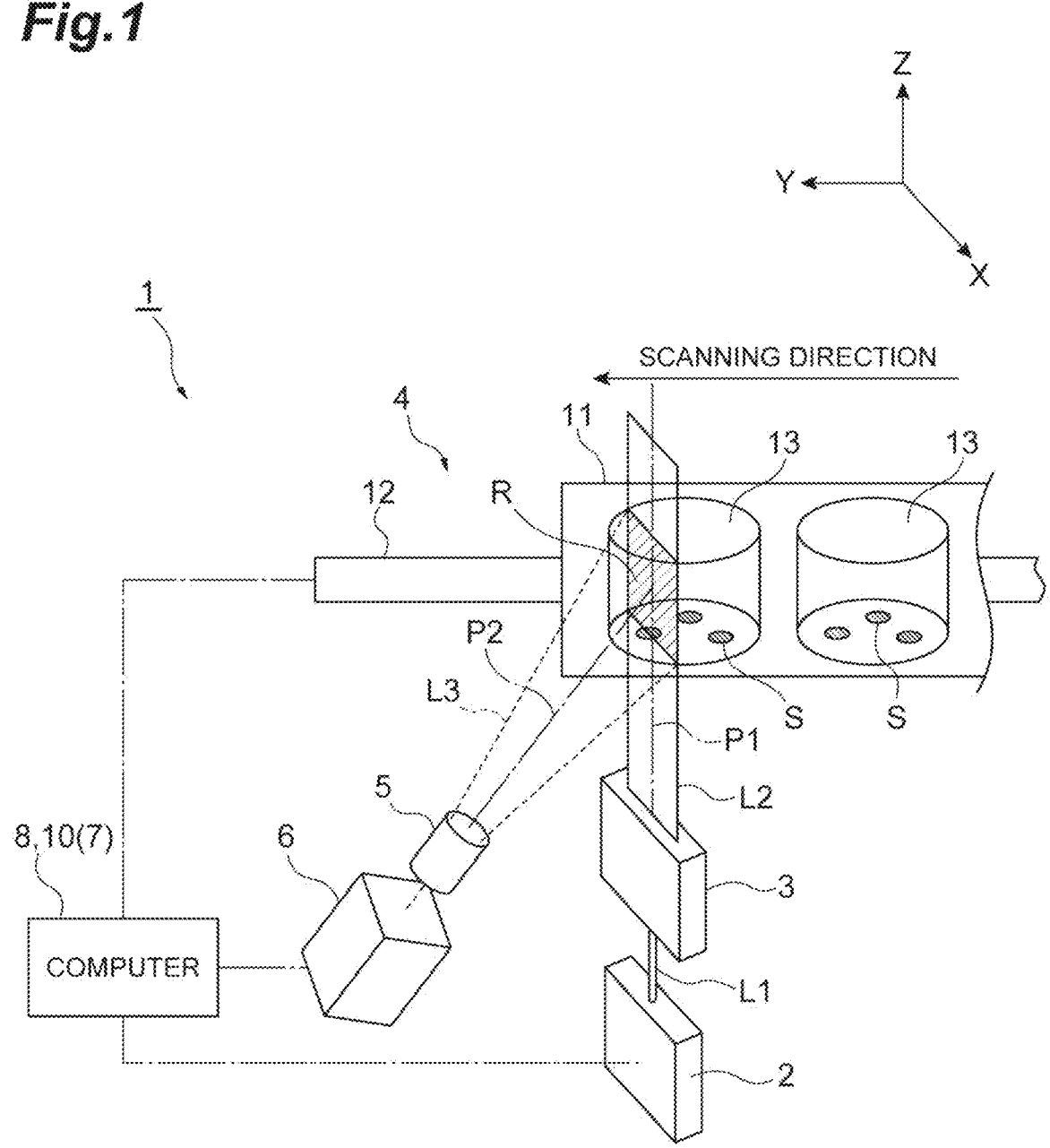
FIG. 1 is a schematic configuration diagram showing an embodiment of a sample observation device.

Hereinafter, preferred embodiments of a sample observation device according to an aspect of the present disclosure will be described in detail with reference to the diagrams FIG. 1 is a schematic configuration diagram showing an embodiment of a sample observation device. This sample observation device 1 is a device that emits planar light L2 to a sample S and forms an image of observation light (for example, fluorescence, scattered light, or the like) generated inside the sample S on the image forming surface to acquire observation image data of the inside of the sample S. As this type of sample observation device 1, there are a slide scanner that acquires and displays an image of the sample S held on a slide glass, a plate reader that acquires image data of the sample S held on a microplate and analyzes the image data, and the like. As shown in FIG. 1, the sample observation device 1 is configured to include a light source 2, an emission optical system 3, a scanning unit 4, an imaging optical system 5, an image acquisition unit 6, and a computer 7.

Examples of the sample S as an observation target include human or animal cells, tissues, organs, animals or plants themselves, and plant cells and tissues. In addition, the sample S may be contained in a solution, a gel, or a substance having a refractive index different from that of the sample S.

The light source 2 is a light source that outputs light L1 to be emitted to the sample S. Examples of the light source 2 include a laser light source, such as a laser diode and a solid-state laser light source. In addition, the light source 2 may be a light emitting diode, a super luminescent diode, or a lamp light source. The light L1 output from the light source 2 is guided to the emission optical system 3.

The emission optical system 3 is an optical system that shapes the light L1 output from the light source 2 into the planar light L2 and emits the shaped planar light L2 to the sample S along an optical axis P1. In the following description, the optical axis P1 of the emission optical system 3 may be referred to as the optical axis of the planar light L2. The emission optical system 3 is configured to include a light shaping element, such as a cylindrical lens, an axicon lens, or a spatial light modulator, and is optically coupled to the light source 2. The emission optical system 3 may be configured to include an objective lens. The planar light L2 formed by the emission optical system 3 is emitted to the sample S. In the sample S to which the planar light L2 is emitted, observation light L3 is generated on the emission surface R of the planar light L2. The observation light L3 is, for example, fluorescence excited by the planar light L2, scattered light of the planar light L2, or diffused reflection light of the planar light L2.

In the case of performing observation in the thickness direction of the sample S, it is preferable that the planar light L2 is thin planar light having a thickness of 2 mm or less in consideration of resolution. In addition, when the thickness of the sample S is very small, that is, when observing the sample S having a thickness equal to or less than the Z-direction resolution described later, the thickness of the planar light L2 does not affect the resolution. Therefore, the planar light L2 having a thickness of more than 2 mm may be used.

Figure 2:
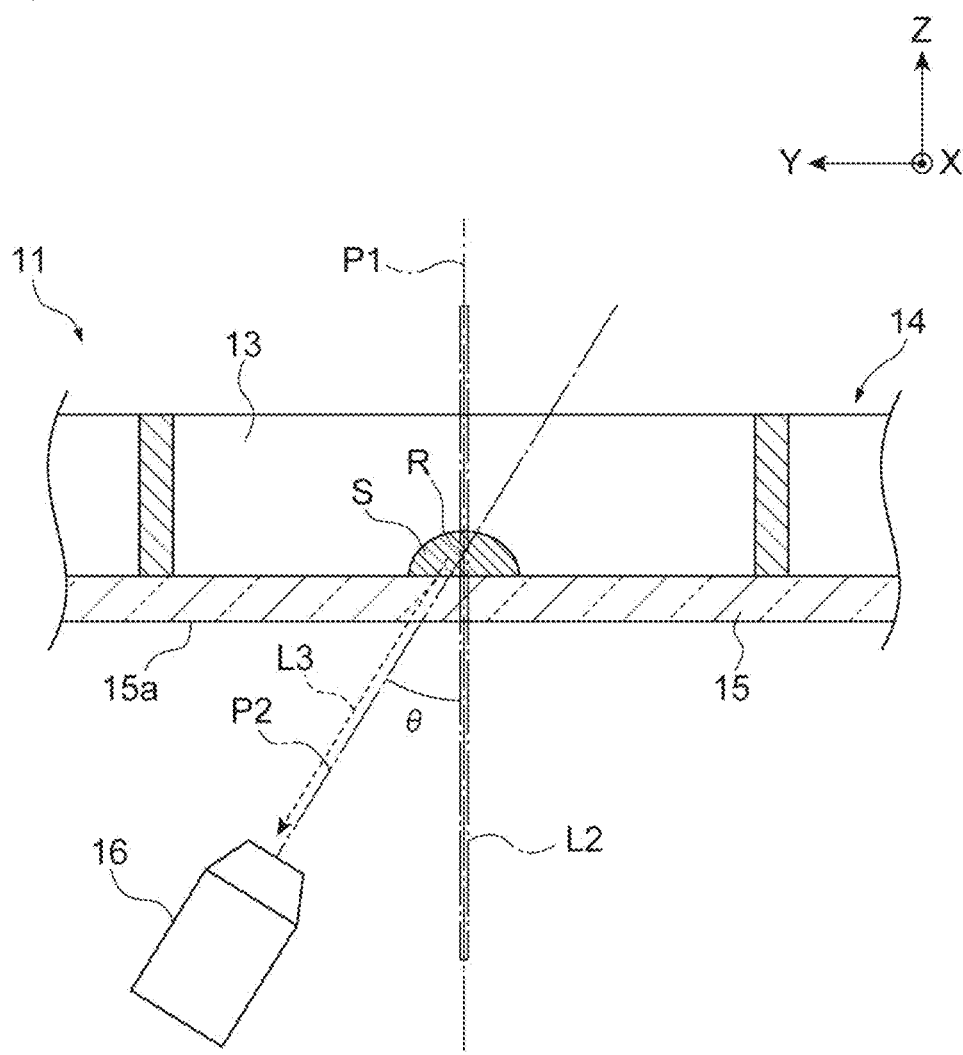
FIG. 2 is an enlarged view of a main part showing the vicinity of a sample.

The scanning unit 4 is a mechanism for scanning the sample S with respect to the emission surface R of the planar light L2. In the present embodiment, the scanning unit 4 is configured by a moving stage 12 that moves a sample container 11 holding the sample S. The sample container 11 is, for example, a microplate, a slide glass, a petri dish, or the like, and is transparent to the planar light L2 and the observation light L3. In the present embodiment, a microplate is exemplified. As shown in FIG. 2, the sample container 11 includes a plate-shaped main body 14 in which a plurality of wells 13, in which the sample S is arranged, are arranged in a straight line (or a matrix) and a plate-shaped transparent member 15 provided so as to close one end side of each of the wells 13 on one surface side of the main body 14.

When arranging the sample S in the well 13, the well 13 may be filled with a medium, such as water. The transparent member 15 has an input surface 15a of the planar light L2 with respect to the sample S arranged in the well 13. The material of the transparent member 15 is not particularly limited as long as this is a member transparent to the planar light L2, and is, for example, glass, quartz, or synthetic resin. The sample container 11 is arranged with respect to the moving stage 12 so that the input surface 15a is perpendicular to the optical axis P1 of the planar light L2. In addition, the other end of the well 13 is open to the outside. The sample container 11 may be fixed to the moving stage 12.

As shown in FIG. 1, the moving stage 12 scans the sample container 11 in a preset direction according to a control signal from the computer 7. In the present embodiment, the moving stage 12 scans the sample container 11 in one direction within a plane perpendicular to the optical axis P1 of the planar light L2. In the following description, the optical axis P1 direction of the planar light L2 is referred to as a Z axis, the scanning direction of the sample container 11 by the moving stage 12 is referred to as a Y axis, and a direction perpendicular to the Y axis within a plane perpendicular to the optical axis P1 of the planar light L2 is referred to as an X axis. The emission surface R of the planar light L2 with respect to the sample S is a surface within the XZ plane.

The imaging optical system 5 is an optical system that forms an image of the observation light L3 generated in the sample S by the emission of the planar light L2. As shown in FIG. 2, the imaging optical system 5 is configured to include, for example, an objective lens 16. The optical axis of the imaging optical system 5 is the observation axis P2 of the observation light L3. The observation axis P2 of the imaging optical system 5 is inclined at an inclination angle θ with respect to the emission surface R of the planar light L2 in the sample S. The inclination angle θ also matches an angle formed by the optical axis P1 of the planar light L2 toward the sample S and the observation axis P2. The inclination angle θ is 10° to 80°. From the viewpoint of improving the resolution of an observed image, it is preferable that the inclination angle θ is 20° to 70°. In addition, from the viewpoint of improving the resolution of the observed image and the stability of the field of view, it is more preferable that the inclination angle θ is 30° to 65°.

As shown in FIG. 1, the image acquisition unit 6 is a device that acquires a plurality of pieces of image data corresponding to the optical image of the observation light L3 formed by the imaging optical system 5. The image acquisition unit 6 is configured to include, for example, an imaging device that captures an optical image of the observation light L3. Examples of the imaging device include area image sensors such as a CMOS image sensor and a CCD image sensor. These area image sensors are arranged on the image forming surface of the imaging optical system 5, captures an optical image by, for example, a global shutter or a rolling shutter, and outputs data of the two-dimensional image to the computer 7.

The image acquisition unit 6 may be configured to acquire a plurality of pieces of partial image data corresponding to a part of the optical image of the observation light L3. In this case, for example, a sub-array may be set on the imaging surface of the area image sensor, and only the pixel columns included in the sub-array may be read out to acquire partial image data. Alternatively, all the pixel columns of the area image sensor may be used as the reading area, and a part of the two-dimensional image may be extracted by subsequent image processing to acquire partial image data. A line sensor may be used instead of the area image sensor, and the imaging surface itself may be limited to one pixel column to acquire partial image data. A slit that transmits only a part of the observation light L3 may be arranged on the front surface of the area image sensor, and image data of pixel columns corresponding to the slit may be acquired as partial image data. When the slit is used, a point sensor, such as a photomultiplier tube, may be used instead of the area image sensor.

The computer 7 is physically configured to include a memory such as a RAM and a ROM, a processor (arithmetic circuit) such as a CPU, a communication interface, a storage unit such as a hard disk, and a display unit such as a display. Examples of the computer 7 include a personal computer, a cloud server, and a smart device (a smartphone, a tablet terminal, and the like). The computer 7 functions as a controller that controls the operations of the light source 2 and the moving stage 12, an image generation unit 8 that generates observation image data of the sample S, and an analysis unit 10 that analyzes observation image data, by executing a program stored in the memory using the CPU of the computer system (refer to FIG. 1).

The computer 7 as a controller receives an input of a measurement start operation by the user, and drives the light source 2, the moving stage 12, and the image acquisition unit 6 in synchronization with each other. In this case, the computer 7 may control the light source 2 so that the light source 2 continuously outputs the light L1 while the sample S is being moved by the moving stage 12, or ON/OFF of the output of the light L1 from the light source 2 may be controlled in accordance with the image capturing by the image acquisition unit 6. In addition, when the emission optical system 3 includes an optical shutter (not shown), the computer 7 may turn ON/OFF the emission of the planar light L2 to the sample S by controlling the optical shutter.

In addition, the computer 7 as the image generation unit 8 generates observation image data of the sample S based on a plurality of pieces of image data generated by the image acquisition unit 6. For example, the image generation unit 8 generates observation image data of the sample S on a plane (XY plane) perpendicular to the optical axis P1 of the planar light L2 based on the plurality of pieces of partial image data output from the image acquisition unit 6. The image generation unit 8 stores the generated observation image data and displays the generated observation image data on a monitor or the like according to a predetermined operation by the user.

Figure 3:
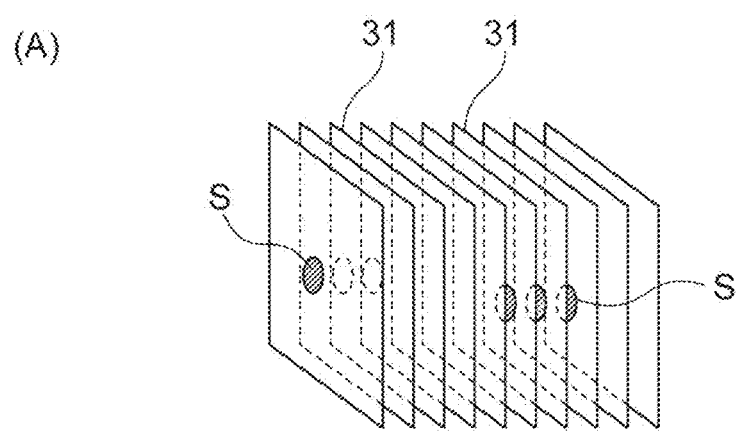
FIG. 3 is a diagram showing an example of generating observation image data by an image generation unit.
Figure 3:
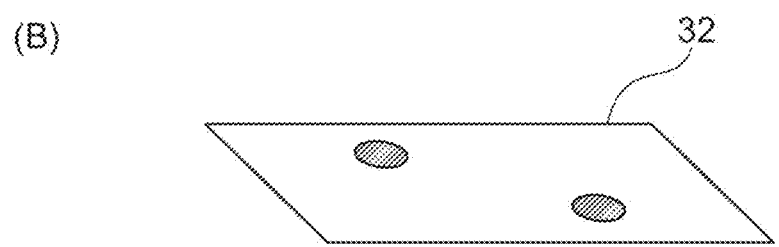

In the present embodiment, as shown in FIGS. 1 and 2, the emission surface R of the planar light L2 with respect to the sample S is a surface within the XZ plane, and the emission surface R is scanned in the Y-axis direction with respect to the sample S. Therefore, as shown in FIG. 3(A), three-dimensional information of the sample S is accumulated in the image generation unit 8 by acquiring a plurality of pieces of image data 31, which is an XZ cross-sectional image, in the Y-axis direction. In the image generation unit 8, data is reconstructed using the plurality of pieces of image data 31. For example, as shown in FIG. 3(B), observation image data 32 in which the background is suppressed is generated. Here, the observation image data 32 is data indicating an XY cross-sectional image having an arbitrary thickness at an arbitrary position in the Z-axis direction in the sample S.

The computer 7 as the analysis unit 10 performs an analysis based on the observation image data 32 generated by the image generation unit 8 and generates an analysis result. The analysis unit 10 stores the generated analysis result and displays the generated analysis result on the monitor or the like according to a predetermined operation by the user. In addition, the observation image data 32 generated by the image generation unit 8 may not be displayed on the monitor or the like, and only the analysis result generated by the analysis unit 10 may be displayed on the monitor or the like. By analyzing the observation image data generated by the image generation unit 8 using the analysis unit 10, the analysis throughput can be improved.

Next, the sample observation device 1 described above will be described in more detail.

Figure 4:
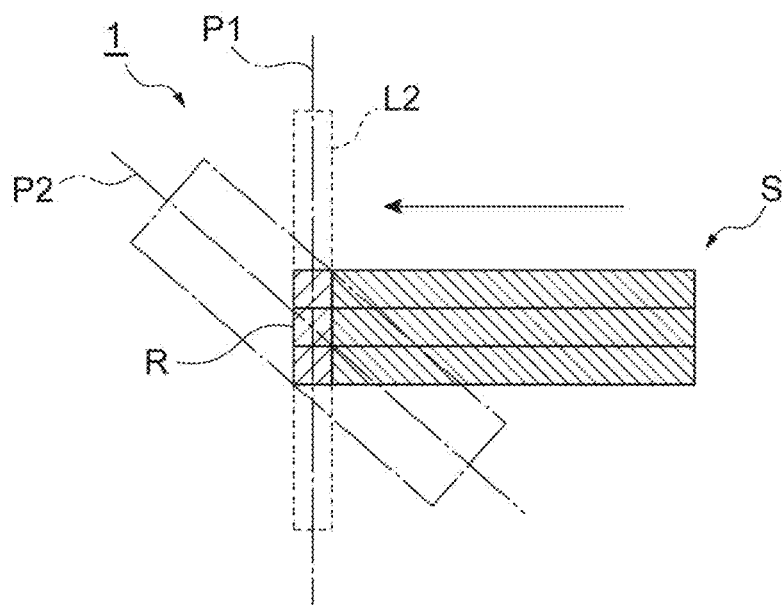
FIG. 4 is a diagram showing how an image is acquired by an image acquisition unit.
Figure 4:
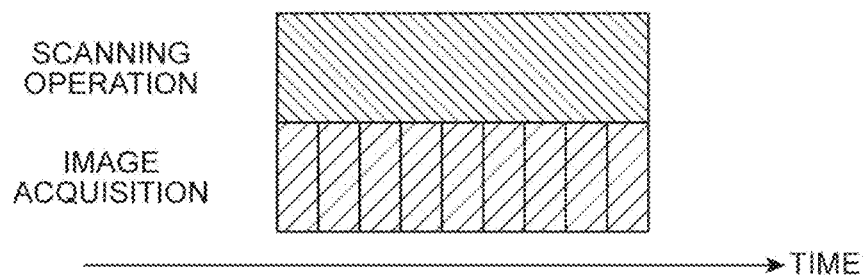

In the sample observation device 1, as shown in FIG. 4(A), the image acquisition unit 6 acquires an image while scanning the sample S with respect to the emission surface R of the planar light L2. In addition, in the sample observation device 1, the observation axis P2 of the imaging optical system 5 is inclined with respect to the emission surface R of the planar light L2. For this reason, the image acquisition unit 6 can sequentially acquire the image data 31 in the optical axis P1 direction (Z-axis direction) of the planar light L2, and the image generation unit 8 can generate the observation image data 32 of the sample S based on the plurality of pieces of image data 31.

In this sample observation device 1, as shown in FIG. 4(B), it is possible to sequentially acquire images while scanning the sample S. In the operation of a conventional sample observation device, a time loss occurs due to the influence of inertia and the like each time the moving stage is driven and stopped. On the other hand, in the sample observation device 1, it is possible to reduce the number of times of driving and stopping the moving stage 12 and simultaneously perform the operation of scanning the sample S and the image acquisition. Therefore, it is possible to improve the throughput until the observation image data 32 is obtained.

In addition, in the sample observation device 1, as shown in FIG. 2, the sample S is held by the sample container 11 having the input surface 15a of the planar light L2, and the optical axis P1 of the planar light L2 by the emission optical system 3 is arranged so as to be perpendicular to the input surface 15a of the sample container 11. In addition, in the sample observation device 1, the scanning unit 4 scans the sample S in a direction (Y-axis direction) perpendicular to the optical axis P1 (Z-axis direction) of the planar light L2 by the emission optical system 3. Therefore, since image processing such as position correction of the observation image data 31 acquired by the image acquisition unit 6 is not necessary, the processing for generating the observation image data 32 can become easy.

Figure 5:
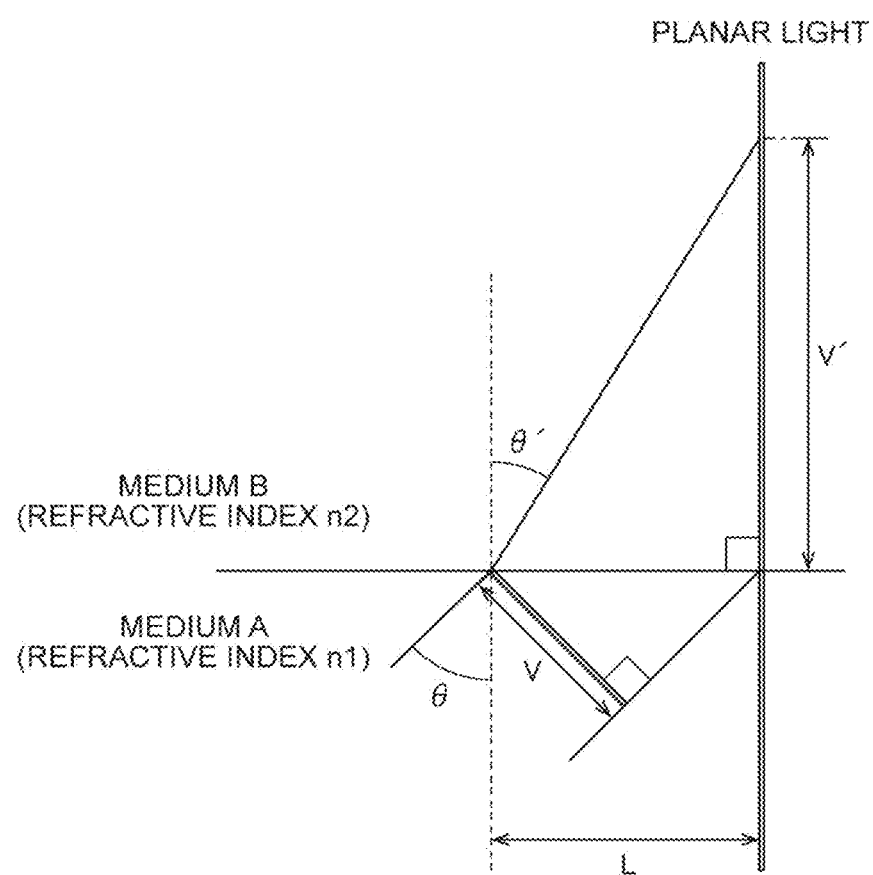
FIG. 5 is a diagram showing an example of calculating a field of view in the sample observation device.

In addition, in the sample observation device 1, the inclination angle θ of the observation axis P2 of the imaging optical system 5 with respect to the emission surface R of the planar light L2 in the sample S is 10° to 80°, preferably 20° to 70°, more preferably 30° to 65°. Hereinafter, this point will be considered. FIG. 5 is a diagram showing an example of calculating a field of view in the sample observation device. In the example shown in the diagram, the imaging optical system is located in a medium A having a refractive index n1, and the emission surface of planar light is located in a medium B having a refractive index n2. Assuming that the field of view in the imaging optical system is V, the emission surface is V', the inclination angle of the observation axis with respect to the emission surface is θ, the refraction angle at the interface between the mediums A and B is θ', and the distance at the interface between the medium A and the medium B at the inclination angle θ of the field of view V is L, the following Equations (1) to (3) are satisfied.

(Equation 1)

$$L = V/\cos\theta \quad (1)$$

(Equation 2)

$$\sin\theta' = (n1/n2) \times \sin\theta \quad (2)$$

(Equation 3)

$$V' = L/\tan\theta' \quad (3)$$

Figure 6:
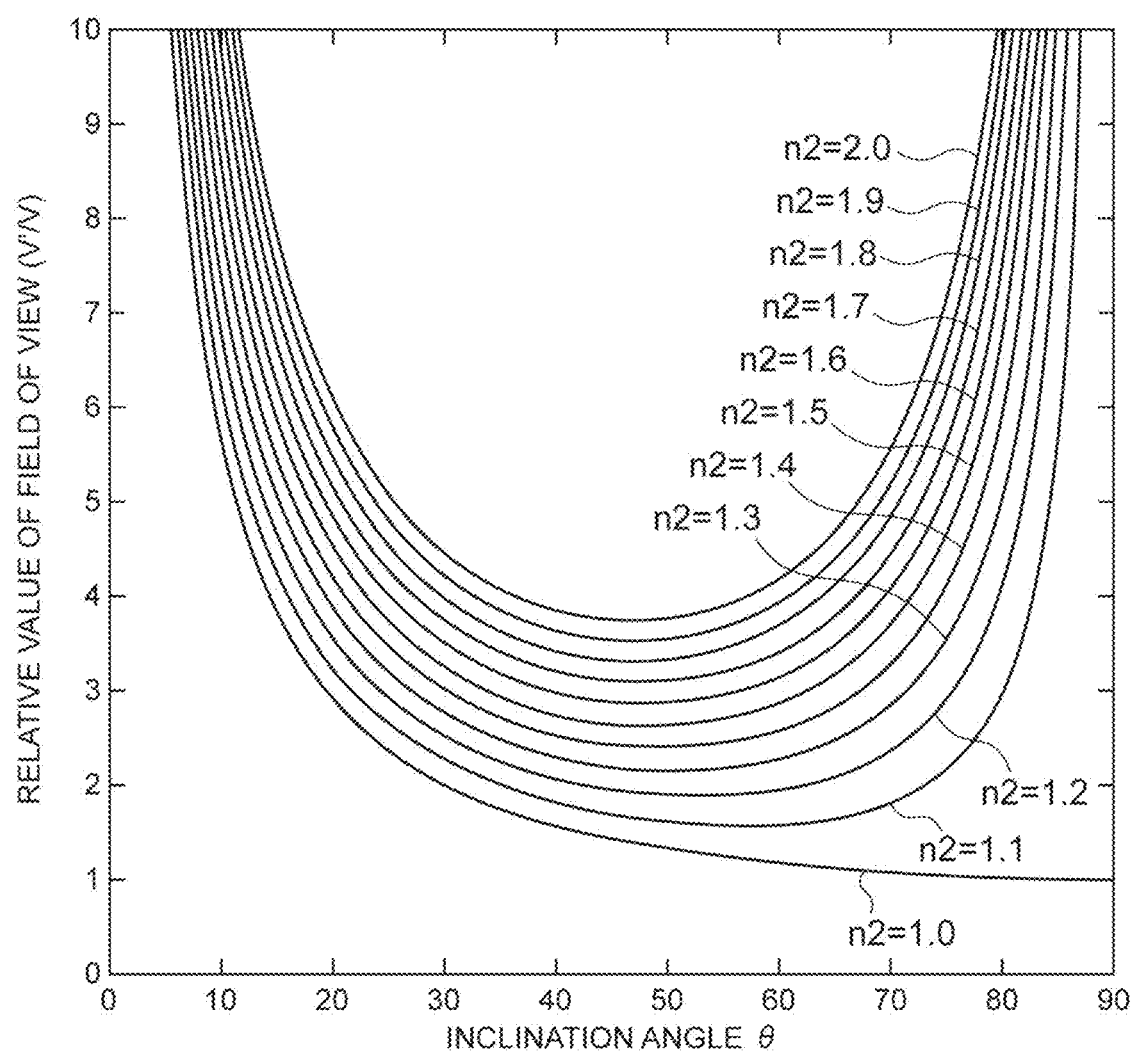
FIG. 6 is a diagram showing a relationship between the inclination angle of the observation axis and resolution.

FIG. 6 is a diagram showing a relationship between the inclination angle of the observation axis and the resolution. In the diagram, the horizontal axis is the inclination angle θ of the observation axis, and the vertical axis is the relative value V'/V of the field of view. Then, the value of V'/V when the refractive index n1 of the medium A is 1 (air) and the refractive index n2 of the medium B is changed in 0.1 increments from 1.0 to 2.0 is plotted with respect to the inclination angle θ. This indicates that the resolution in the depth direction (hereinafter referred to as "Z-direction resolution") of a sample becomes higher as the value of V'/V becomes smaller and the Z-direction resolution becomes lower as the value of V'/V becomes larger. From the result shown in FIG. 6, it can be seen that when the refractive index n1 of the medium A and the refractive index n2 of the medium B are the same, the value of V'/V is inversely proportional to the inclination angle θ. In addition, when the refractive index n1 of the medium A and the refractive index n2 of the medium B are different, it can be seen that the value of V'/V draws a parabola with respect to the inclination angle θ. From this result, it can be seen that the Z-direction resolution can be controlled by the refractive index of the arrangement space of the sample, the refractive index of the arrangement space of the imaging optical system, and the inclination angle θ of the observation axis. In addition, it can be seen that in the range of the inclination angle θ of 10° to 80°, a better Z-direction resolution than in the range of the inclination angle θ less than 10° and larger than 80° can be obtained.

In addition, from the result shown in FIG. 6, it can be seen that the inclination angle θ at which the Z-direction resolution is a maximum tends to decrease as the difference between the refractive index n1 and the refractive index n2 increases. When the refractive index n2 is in the range of 1.1 to 2.0, the inclination angle θ at which the Z-direction resolution is a maximum is in the range of about 47° to about 57°. For example, when the refractive index n2 is 1.33 (water), the inclination angle θ at which the Z-direction resolution is a maximum is estimated to be about 52°. In addition, for example, when the refractive index n2 is 1.53 (glass), the inclination angle θ at which the Z-direction resolution is a maximum is estimated to be about 48°.

Figure 7:
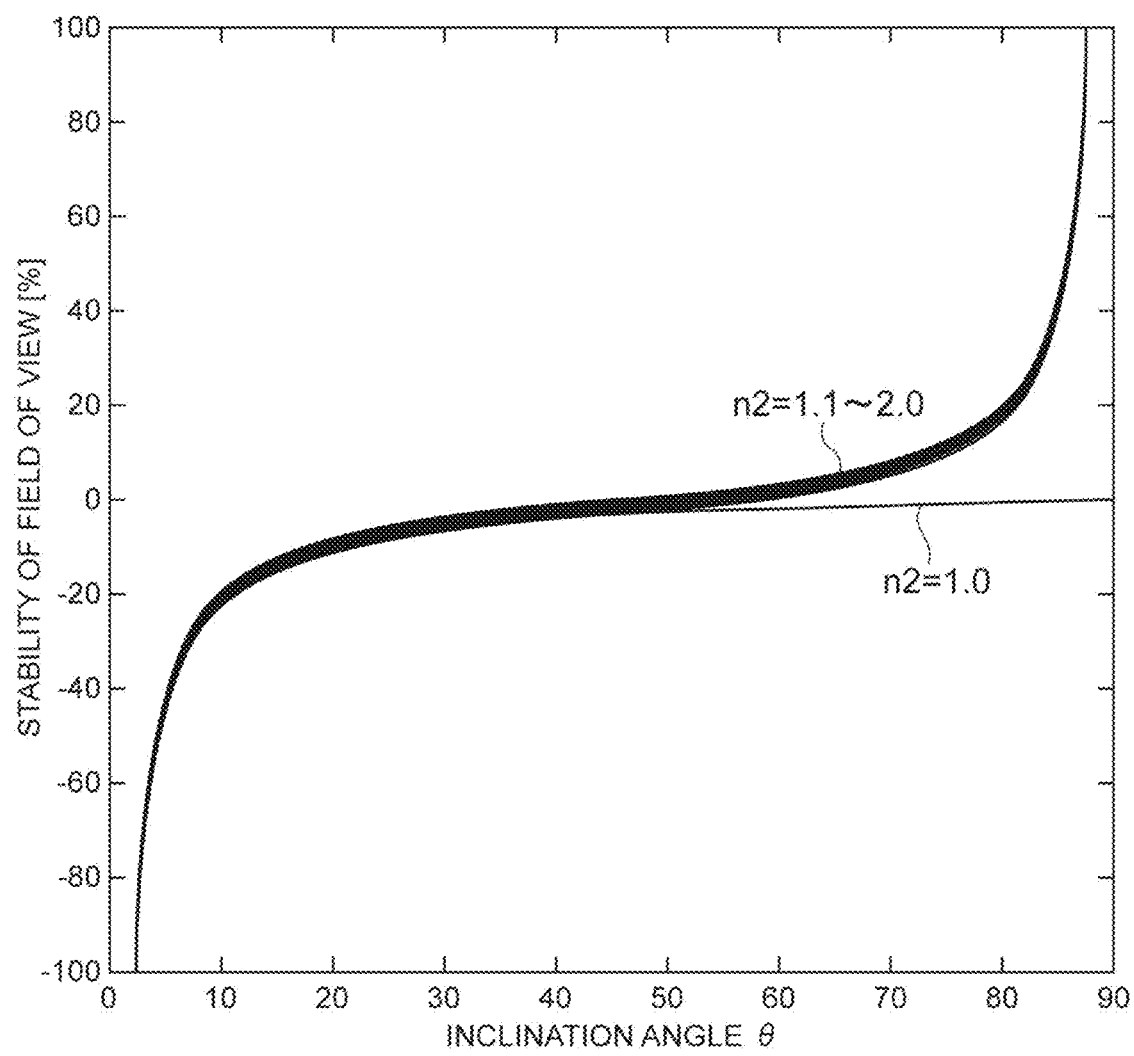
FIG. 7 is a diagram showing a relationship between the inclination angle of the observation axis and the stability of the field of view.

FIG. 7 is a diagram showing a relationship between the inclination angle of the observation axis and the stability of the field of view. In the diagram, the horizontal axis is the inclination angle θ of the observation axis, and the vertical axis is the stability of the field of view. The stability is expressed by the ratio of a difference value between V'/V at the inclination angle θ+1 and V'/V at the inclination angle θ−1 to V'/V at the inclination angle θ, and is calculated based on the following Equation (4). The closer the stability is to 0%, the smaller the change in the field of view with respect to the change in the inclination angle, and it can be evaluated that the field of view is stable. Similar to FIG. 6, in FIG. 7, the stability when the refractive index n1 of the medium A is 1 (air) and the refractive index n2 of the medium B is changed in 0.1 increments from 1.0 to 2.0 is plotted.

(Equation 4)

$$\text{Stability}(\%) = ((V'/V)_{\theta+1} - (V'/V)_{\theta-1})/(V'/V)_\theta \quad (4)$$

From the result shown in FIG. 7, it can be seen that in a range where the inclination angle θ is less than 10° and exceeds 80°, the stability exceeds ±20% and it is difficult to control the field of view. On the other hand, when the inclination angle θ is in the range of 10° to 80°, the stability is ±20% or less, and the field of view can be controlled. In addition, when the inclination angle θ is in the range of 20° to 70°, the stability is ±10% or less, and it becomes easy to control the field of view.

Figure 8:
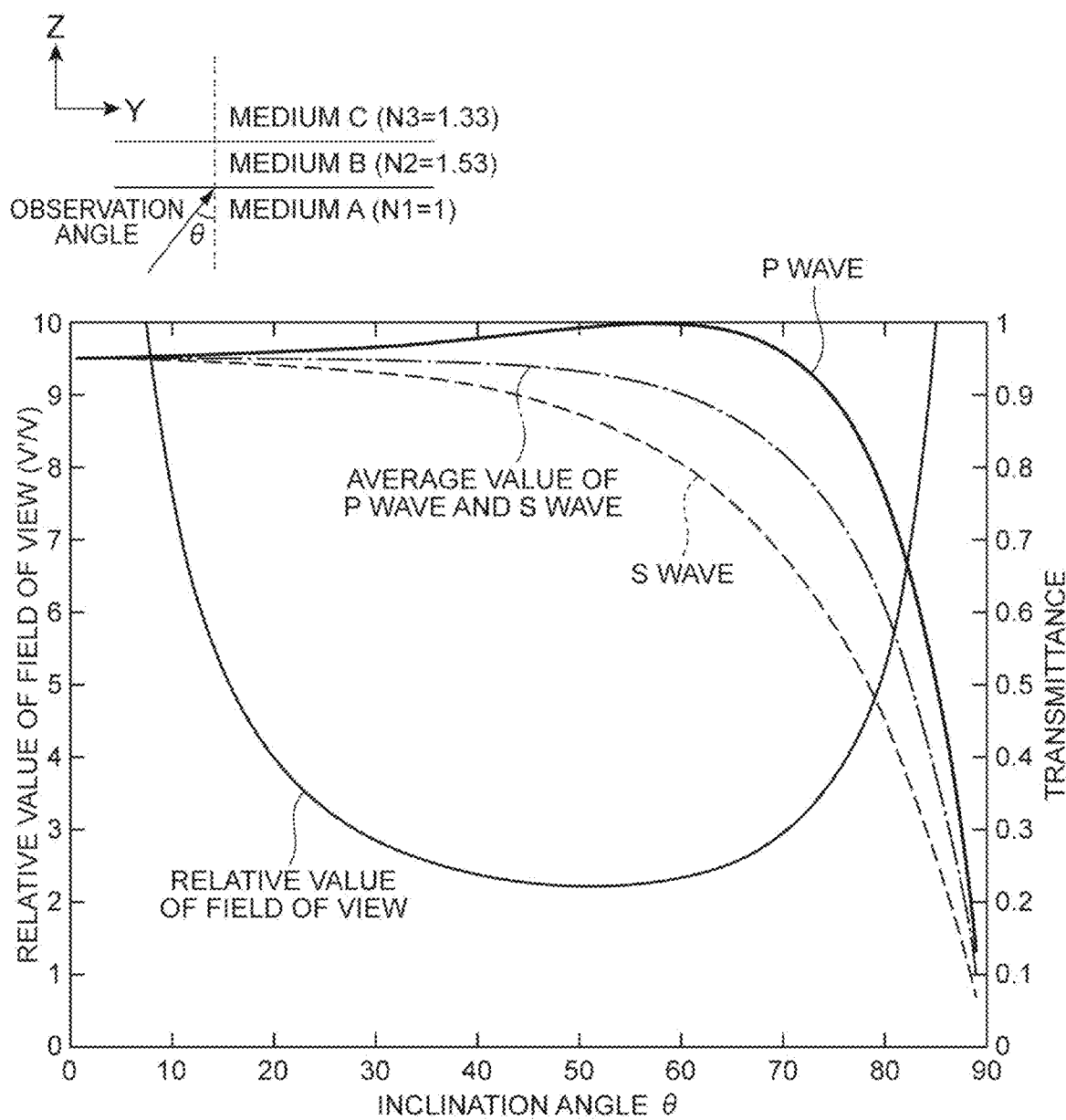
FIG. 8 is a diagram showing a relationship between the inclination angle of the observation axis and the transmittance of observation light from a sample.

FIG. 8 is a diagram showing a relationship between the inclination angle of the observation axis and the transmittance of observation light from a sample. In the diagram, the horizontal axis is the inclination angle θ of the observation axis, the vertical axis on the left side is the relative value of the field of view, and the vertical axis on the right side is the transmittance. In FIG. 8, in consideration of the sample holding state in the sample container, assuming that the refractive index n1 of the medium A is 1 (air), the refractive index n2 of the medium B is 1.53 (glass), and the refractive index n3 of the medium C is 1.33 (water), the transmittance value is a product of the transmittance of the interface between the mediums B and C and the transmittance of the interface between the mediums A and B. In FIG. 8, the P wave transmittance, the S wave transmittance, and the angle dependence of their average value are plotted. In addition, in FIG. 8, the relative value of the field of view in the medium C is also plotted.

From the result shown in FIG. 8, it can be seen that the transmittance of the observation light from the sample to the imaging optical system can be changed by changing the inclination angle θ of the observation axis. It can be seen that the transmittance of at least 50% or more is obtained when the inclination angle θ is in the range of 80° or less. In addition, it can be seen that the transmittance of at least 60% or more is obtained when the inclination angle θ is in the range of 70° or less and the transmittance of at least 75% or more is obtained when the inclination angle θ is in the range of 65° or less. From the above results, when the Z-direction resolution of the sample is required, for example, it is preferable to select the inclination angle θ from the range of 30° to 65° so that the value of V'/V that is the relative value of the field of view is 3 or less, the stability is less than 5%, and the transmittance of the observation light (the average value of the P wave and the S wave) is 75% or more. In addition, when the Z-direction resolution of the sample is not required, the inclination angle θ may be appropriately selected from the range of 10° to 80°. From the viewpoint of securing the range of the field of view per pixel, it is preferable to select the inclination angle θ from the range of 10° to 30° or 65° to 80°.

As described above, when the observation axis P2 of the imaging optical system 5 is inclined with respect to the emission surface R of the planar light L2 in the sample S, it is necessary to consider the influence of the astigmatism of the observation light L3 in the imaging optical system 5. As the influence of the astigmatism of the observation light L3 increases, the image forming performance of the observation light L3 on the image forming surface of the imaging optical system 5 may be lowered, and the quality of the observation image may deteriorate.

Figure 9:
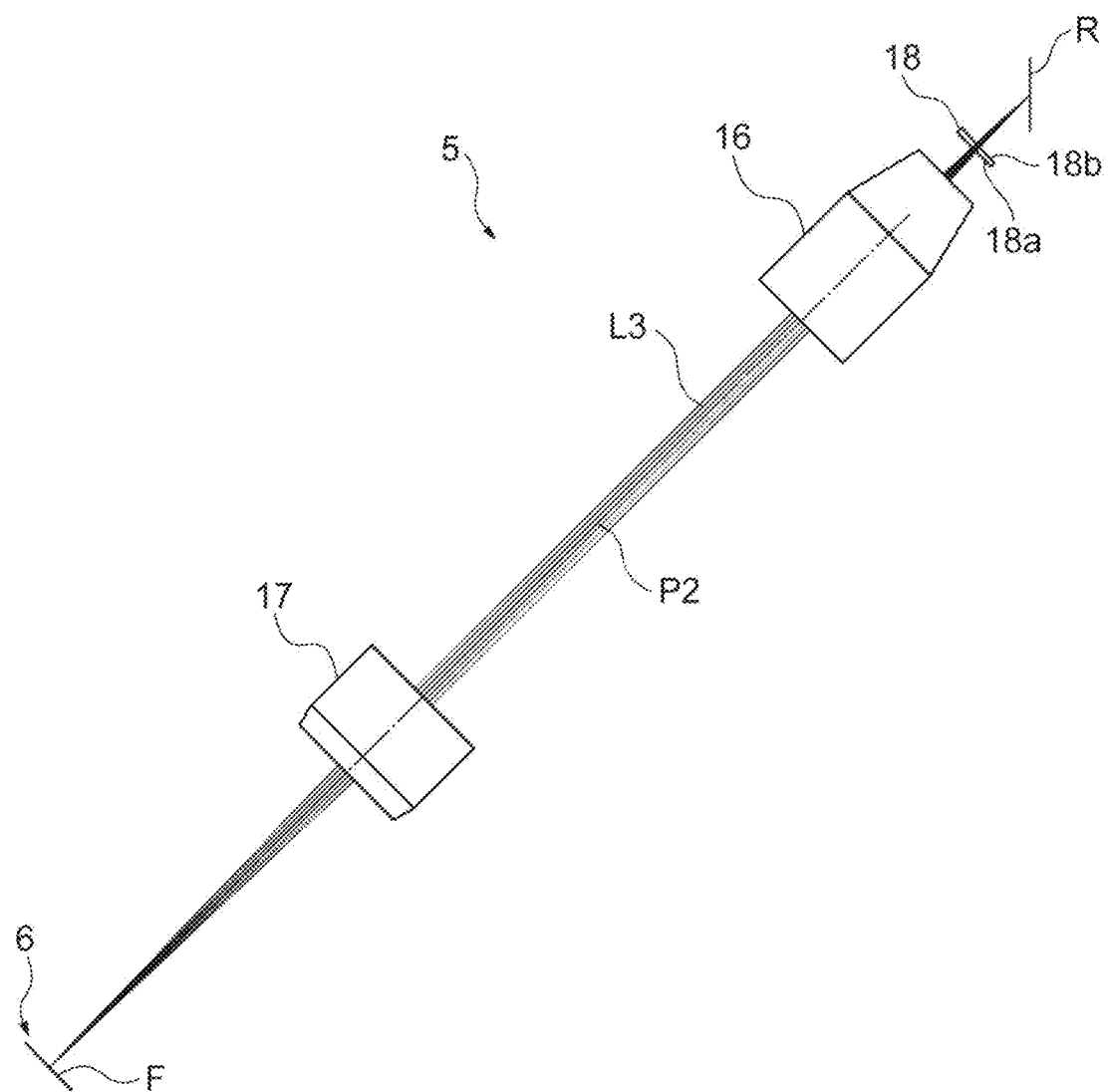
FIG. 9 is a diagram showing an example of the configuration of an imaging optical system.

On the other hand, more specifically, the imaging optical system 5 of the sample observation device 1 is configured to include the objective lens 16, an imaging lens 17, and a wedge prism 18, as shown in FIG. 9. The objective lens 16 and the imaging lens 17 form an infinity correction optical system. The observation light L3 from the sample S becomes parallel light between the objective lens 16 and the imaging lens 17, and forms an image on an image forming surface (imaging surface of the image acquisition unit 6) F by the imaging lens 17.

Figure 10:
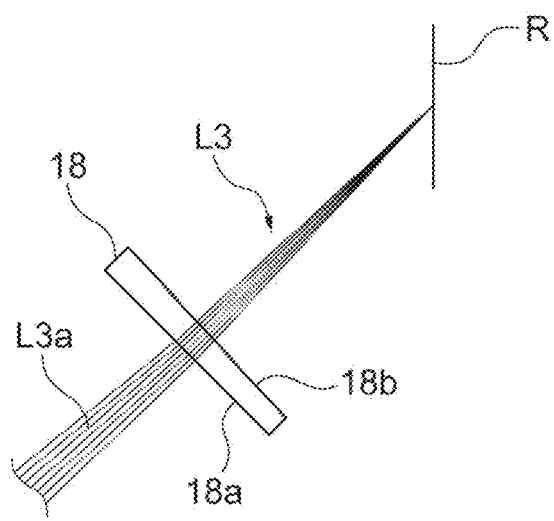
FIG. 10 is a diagram showing a state of light beams of observation light passing through a wedge prism.
Figure 10:
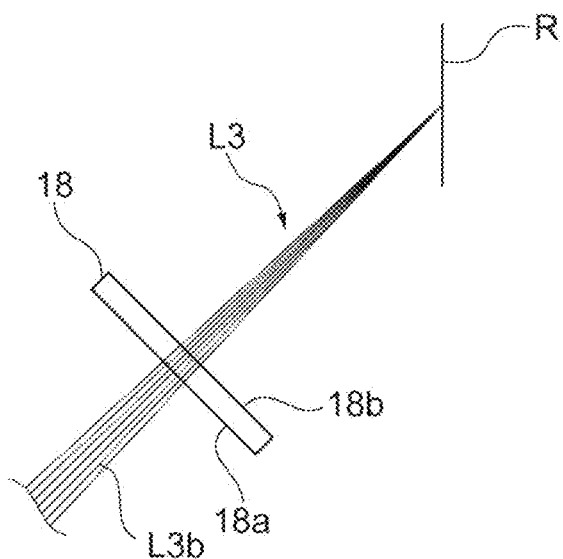

In the present embodiment, the wedge prism 18 is arranged between the emission surface R of the planar light L2 and the objective lens 16. The wedge prism 18 is a prism in which one main surface 18a and the other main surface 18b are parallel to each other in one direction but the other main surface 18b is inclined at a predetermined angle with respect to the one main surface 18a in the other direction perpendicular to the one direction. That is, the wedge prism 18 is a prism whose thickness changes uniformly in one direction and whose thickness does not change in the other direction perpendicular to the one direction. Therefore, the wedge prism 18 functions as a non-axisymmetric optical element that bends a light beam L3a on one axis of the observation light L3 at a predetermined deflection angle according to the incidence position as shown in FIG. 10(A) but does not bend a light beam L3b on the other axis of the observation light L3 perpendicular to the one axis as shown in FIG. 10(B). In addition, as shown in FIG. 9, when the wedge prism 18 is arranged between the emission surface R of the planar light L2 and the objective lens 16, one main surface 18a may be arranged so as to be perpendicular to the optical axis of the objective lens 16. In this case, optical adjustment becomes easy.

Figure 11:
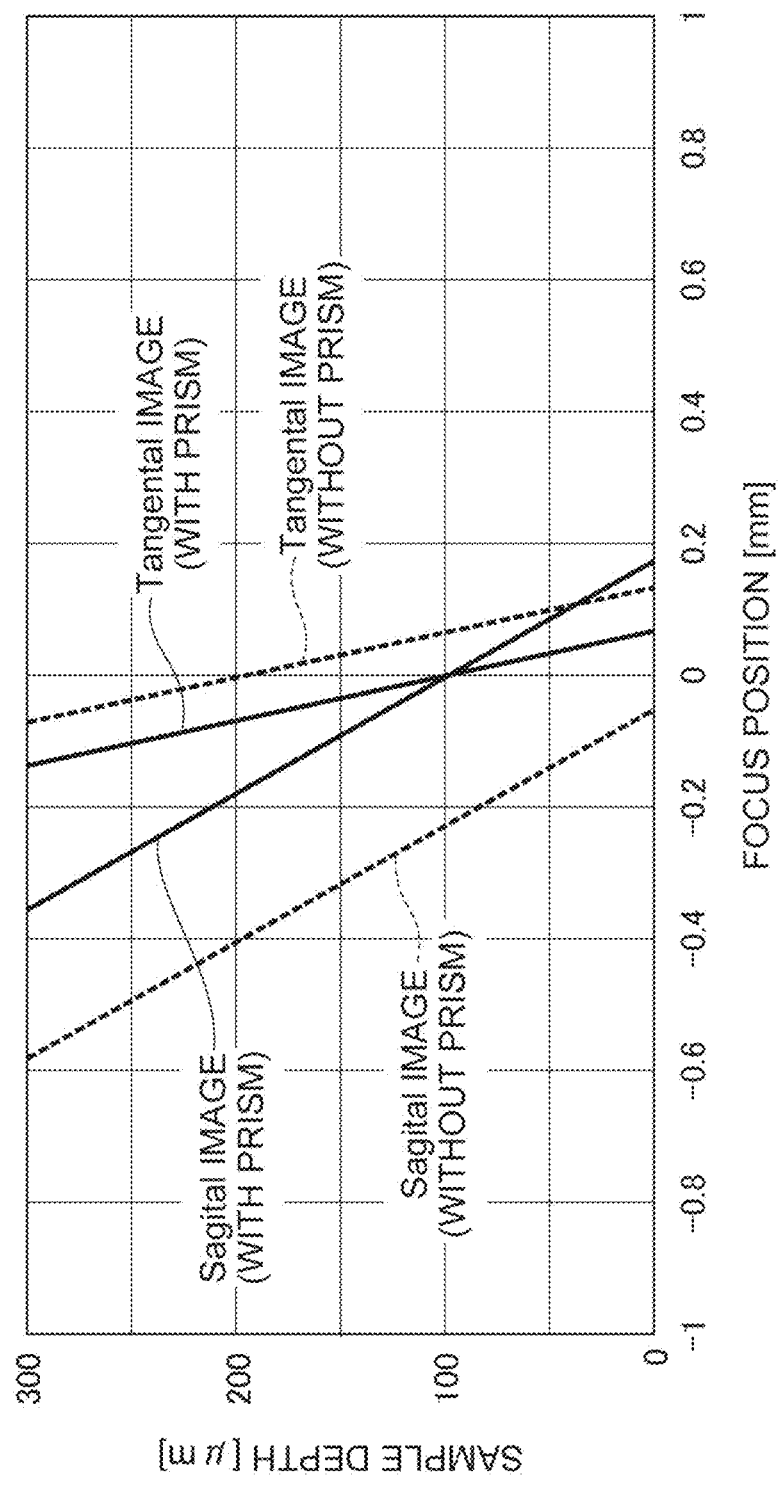
FIG. 11 is a comparison diagram of the astigmatism of observation light according to presence or absence of a wedge prism.

FIG. 11 is a comparison diagram of the astigmatism of observation light according to presence or absence of a wedge prism. In the diagram, the horizontal axis indicates the focus position, and the vertical axis indicates the sample depth. In FIG. 11, assuming that the inclination angle θ of the observation axis P2 is 45°, the focus positions of the Tangential image plane and the Sagital image plane from the sample depth of 0 μm (interface) to 300 μm are plotted when the wedge prism 18 is arranged in the imaging optical system 5 and when the wedge prism 18 is not arranged in the imaging optical system 5.

Here, the Tangential image plane is the image plane of the light beam L3b on the axis that is not bent by the wedge prism 18, and the Sagital image plane is the image plane of the light beam L3a on the axis that is bent by the wedge prism. At each sample depth, the difference between the focus position on the Tangential image plane and the focus position on the Sagital image plane indicates the degree of astigmatism of the observation light L3. From the result shown in FIG. 11, in the entire range of the sample depth from 0 μm (interface) to 300 μm, the difference between the focus position on the Tangential image plane and the focus position on the Sagital image plane when the wedge prism 18 is arranged in the imaging optical system 5 is smaller than that when the wedge prism 18 is not arranged in the imaging optical system 5. Therefore, it can be confirmed that the configuration in which the wedge prism 18 is arranged in the imaging optical system 5 contributes to the reduction of the astigmatism of the observation light L3.

Figure 12:
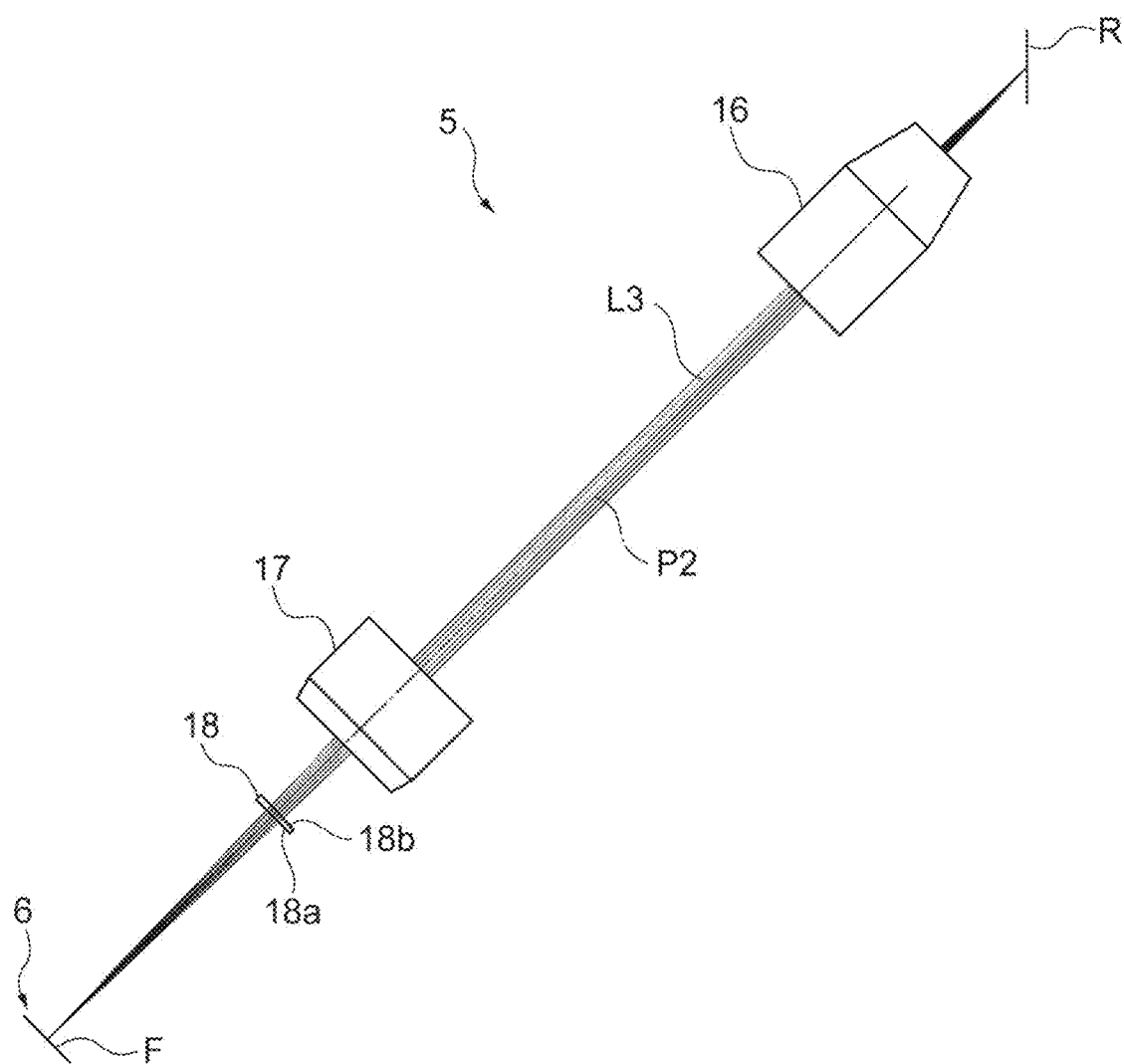
FIG. 12 is a diagram showing another example of the configuration of the imaging optical system.
Figure 13:
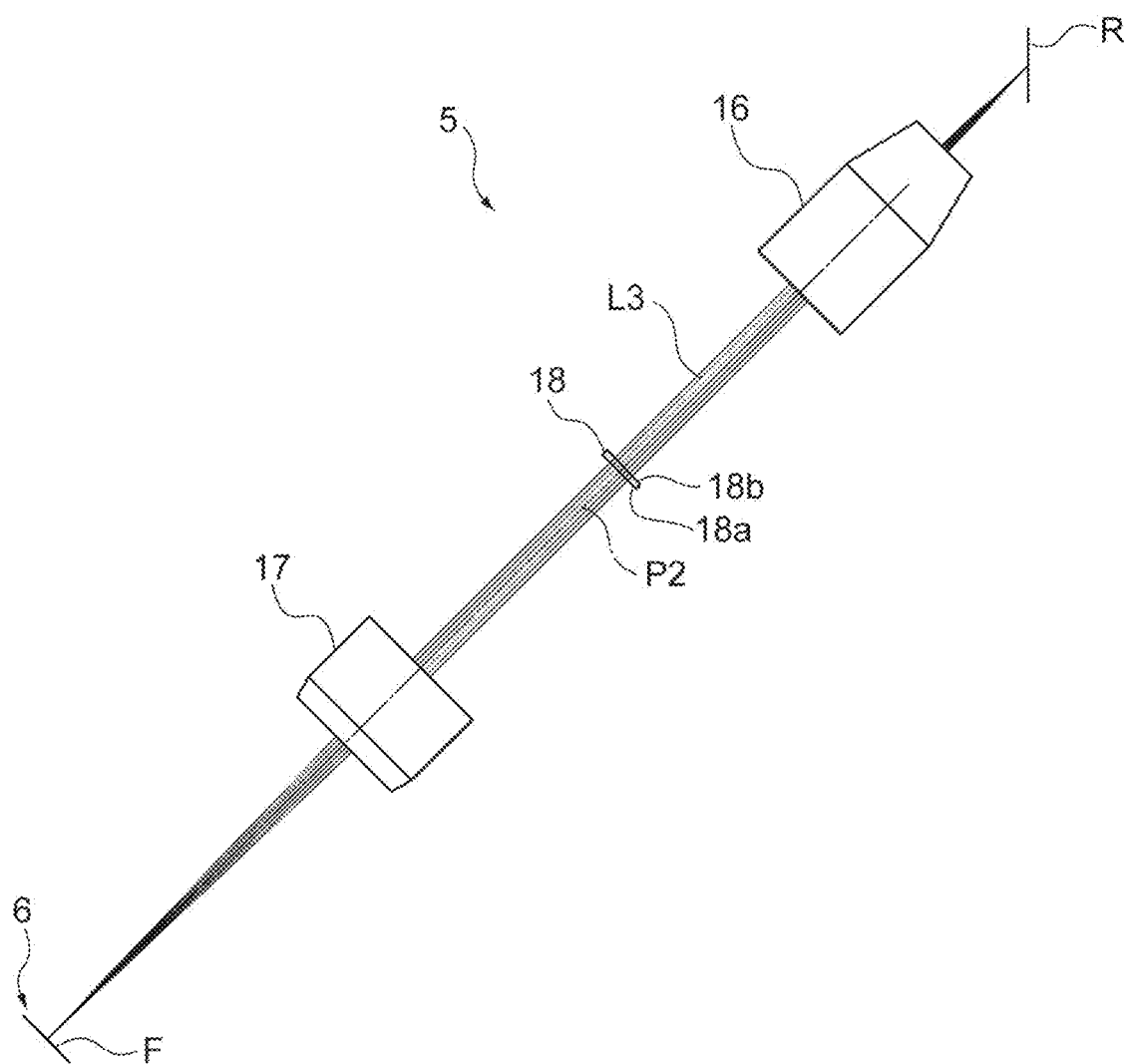
FIG. 13 is a diagram showing still another example of the configuration of the imaging optical system.

In addition, although the wedge prism 18 is arranged between the emission surface R of the planar light L2 and the objective lens 16 in the form shown in FIG. 9, the arrangement of the wedge prism 18 is not limited to the from. For example, as shown in FIG. 12, the wedge prism 18 may be arranged between the imaging lens 17 and the image acquisition unit 6. When an infinity correction optical system is configured by the objective lens 16 and the imaging lens 17, the operational effect of reducing the astigmatism of the observation light L3 as described above is appropriately achieved by arranging the wedge prism 18 between the objective lens 16 and the imaging lens 17. In addition, for example, as shown in FIG. 13, the wedge prism 18 may be arranged between the objective lens 16 and the imaging lens 17. When the wedge prism 18 is arranged at this position, the wedge prism 18 is less likely to interfere with other components, such as the scanning unit 4, so that the imaging optical system 5 can be easily configured.

Figure 14:
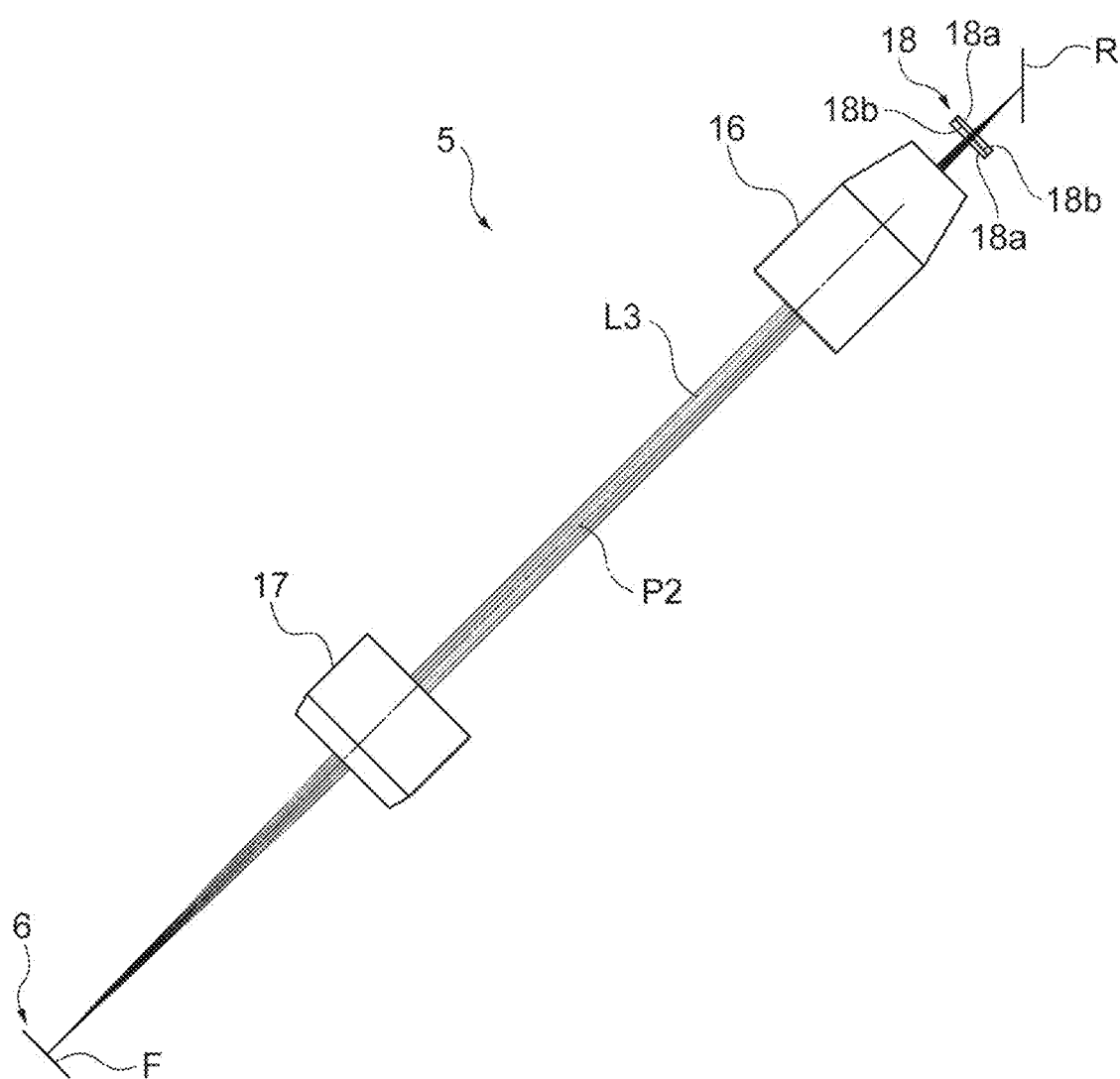
FIG. 14 is a diagram showing still another example of the configuration of the imaging optical system.

In addition, as shown in FIG. 14, a plurality of wedge prisms 18 may be arranged in the imaging optical system 5. A combination of two wedge prisms 18 is referred to as a doublet prism, and a combination of three wedge prisms 18 is referred to as a triplet prism. In the example shown in FIG. 14, two wedge prisms 18 are arranged between the emission surface R of the planar light L2 and the objective lens 16. By arranging the plurality of wedge prisms 18, it is possible to reduce not only the astigmatism of the observation light L3 but also the chromatic aberration of the observation light L3.

Figure 15:
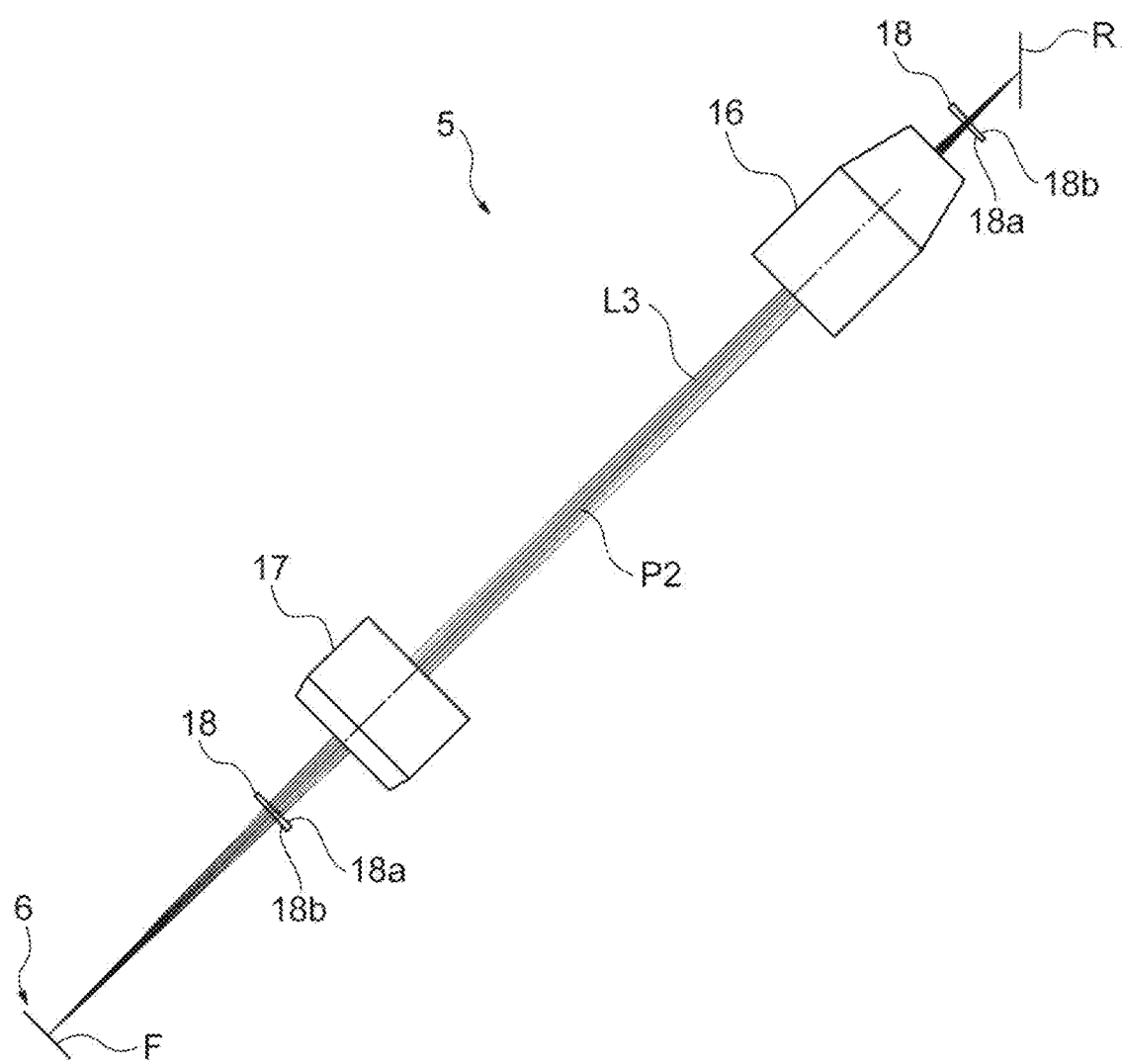
FIG. 15 is a diagram showing still another example of the configuration of the imaging optical system.

The plurality of wedge prisms 18 may be arranged in a state in which the main surfaces 18a and 18b are in contact with each other or bonded to each other, or may be arranged so as to be spaced apart from each other. When the wedge prisms 18 are arranged so as to be spaced apart from each other, the arrangement position of each wedge prism 18 may be any of between the emission surface R of the planar light L2 and the objective lens 16, between the objective lens 16 and the imaging lens 17, and between the imaging lens 17 and the image acquisition unit 6. For example, as shown in FIG. 15, one wedge prism 18 may be arranged between the emission surface R of the planar light L2 and the objective lens 16, and the other wedge prism 18 may be arranged between the imaging lens 17 and the image acquisition unit 6.

Figure 16:
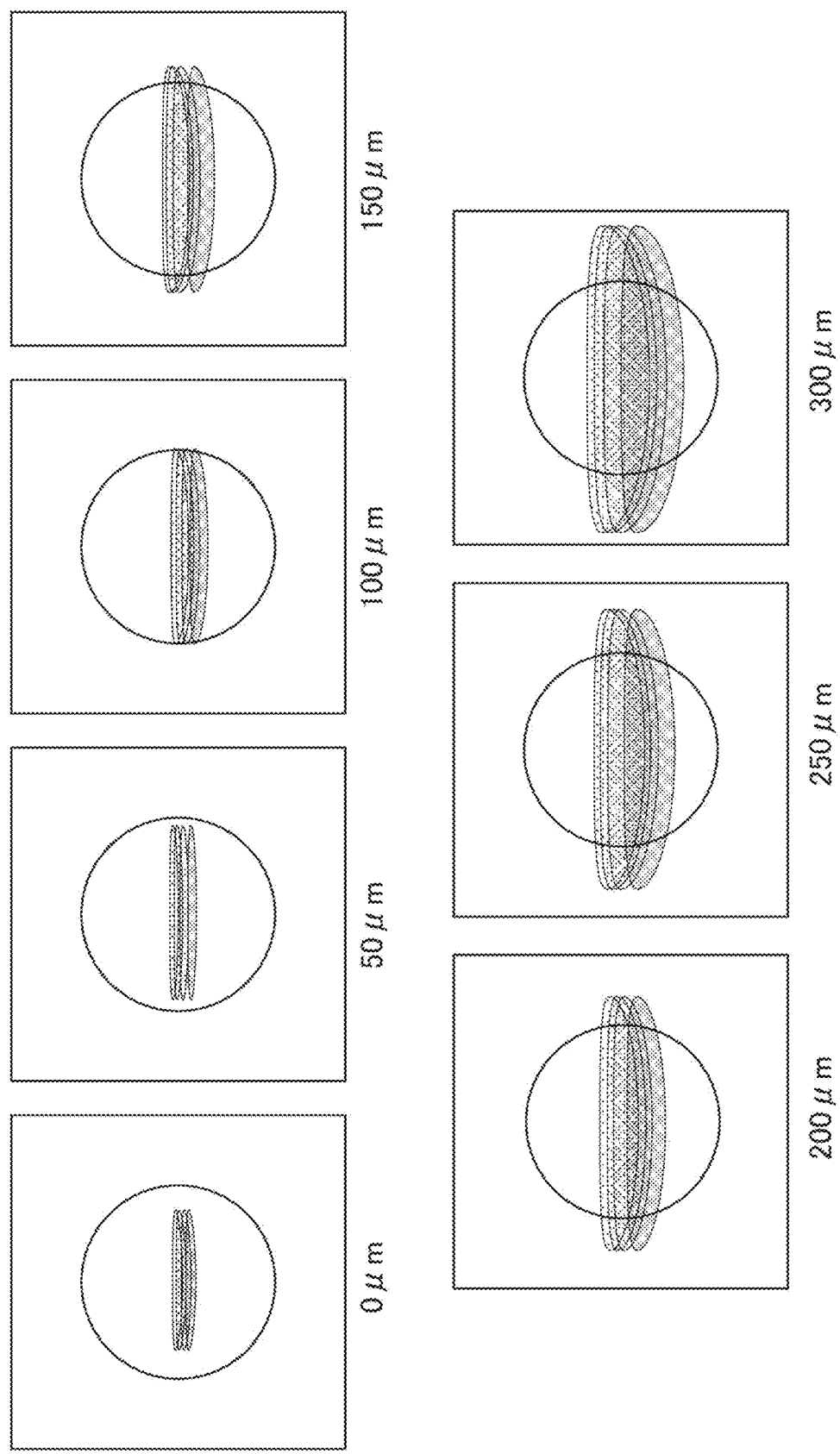
FIG. 16 is a diagram showing a check test result of the effect of reducing the astigmatism and the chromatic aberration of a wedge prism.
Figure 17:
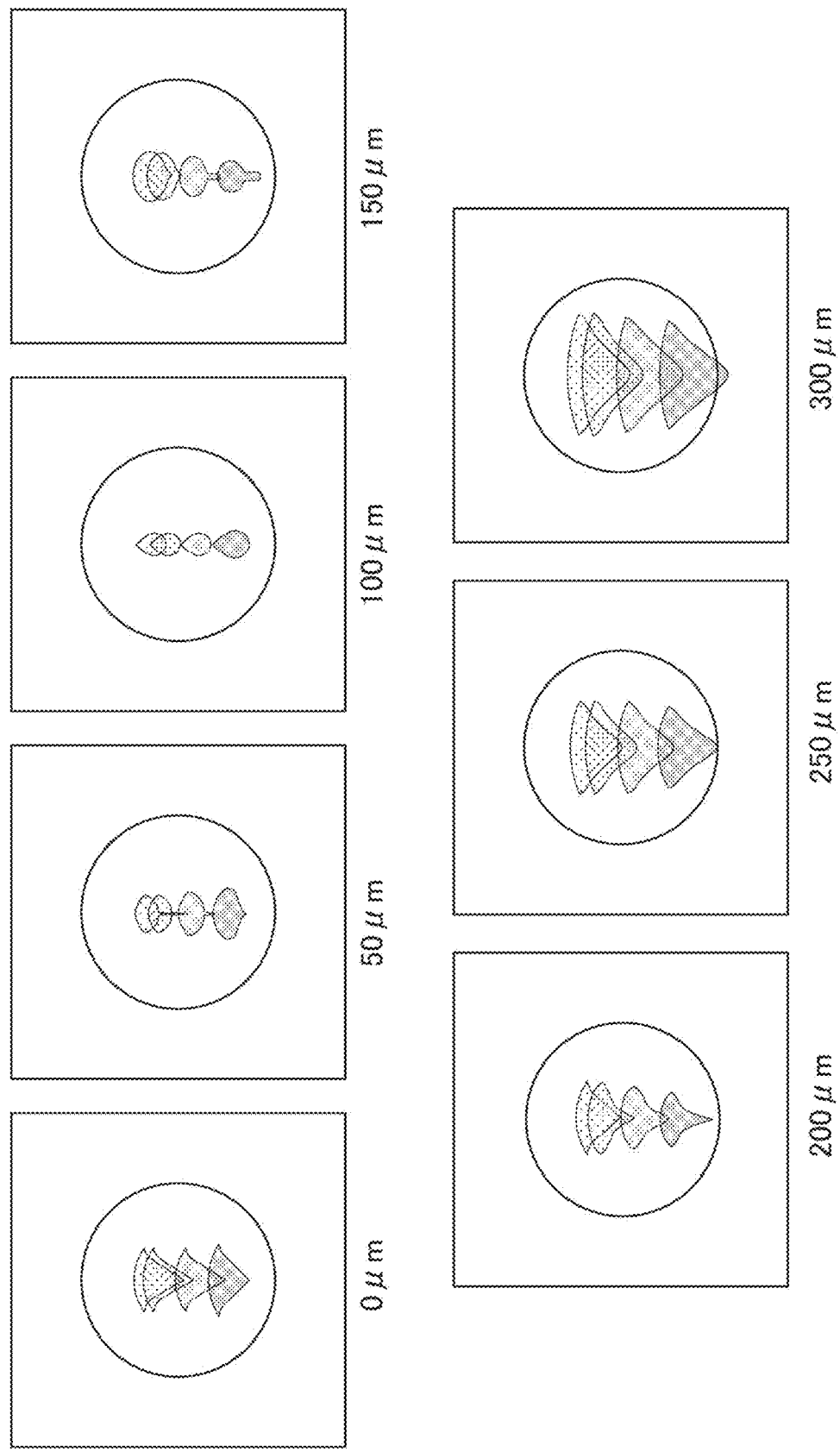
FIG. 17 is a diagram showing a check test result of the effect of reducing the astigmatism and the chromatic aberration of a wedge prism.
Figure 18:
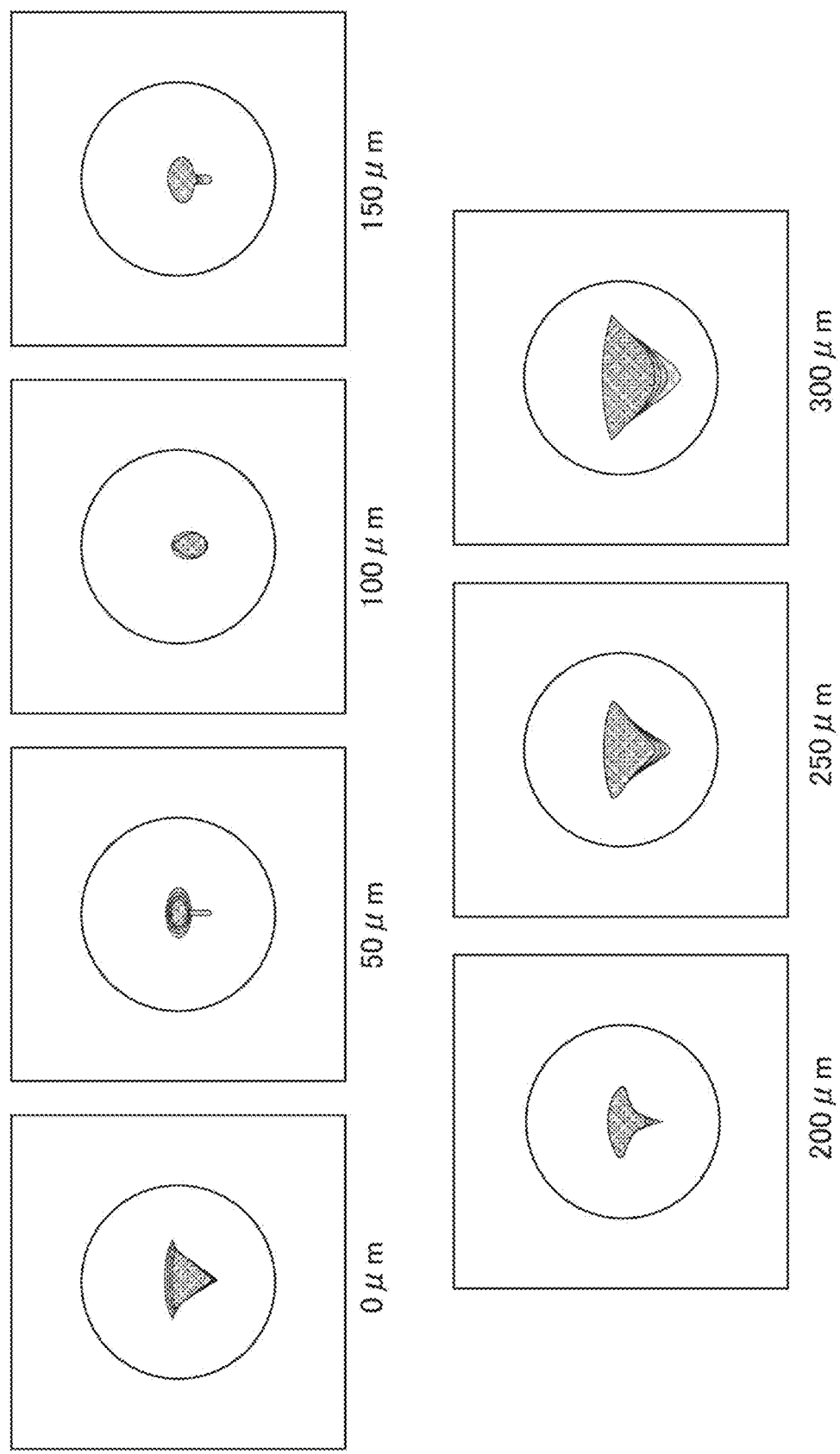
FIG. 18 is a diagram showing a check test result of the effect of reducing the astigmatism and the chromatic aberration of a wedge prism.

FIGS. 16 to 18 are diagrams showing check test results of the effect of reducing the astigmatism and the chromatic aberration of the wedge prism 18. These check test results are diagrams in which the inclination angle θ of the observation axis P2 is 55° and the spot shape of the observation light L3 when the sample depth is 0 μm (interface) to 300 μm is shown in increments of 50 μm. The wavelength of the observation light L3 is four wavelengths of 458 nm, 530 nm, 629 nm, and 680 nm, and the respective spot shapes are shown so as to overlap each other. These show that the astigmatism increases as the distortion (spreading) of the spot shape in the horizontal direction increases and that the chromatic aberration (chromatic aberration of magnification) increases as the variation of the spot shape in the vertical direction increases. The circle in the diagram is the diameter of the Airy disk.

FIG. 16 shows the result of a comparative example in which the wedge prism 18 is not arranged in the imaging optical system 5. FIG. 17 shows the result of an example in which one wedge prism 18 is arranged in the imaging optical system 5. FIG. 18 shows the result of an embodiment in which two wedge prisms 18 are arranged in the imaging optical system 5. From these results, it can be seen that the astigmatism of the observation light L3 is reduced when one wedge prism 18 is arranged in the imaging optical system 5 and that both the astigmatism and the chromatic aberration of the observation light L3 are reduced when two wedge prisms 18 are arranged in the imaging optical system 5. From these results, it can be confirmed that the Z-direction resolution of the observation image can be improved by the inclination of the observation axis P2 and the astigmatism of the observation light L3 can be reduced by arranging the wedge prism 18. It can also be confirmed that the chromatic aberration of the observation light L3 can be reduced by arranging a plurality of wedge prisms 18.

The present disclosure is not limited to the above-described embodiment. For example, in the above-described embodiment, the imaging optical system 5 including the objective lens 16 and the imaging lens 17 is exemplified. However, when a finite objective lens is used as the objective lens 16, the arrangement of the imaging lens 17 is not necessary. In this case, the wedge prism 18 may be arranged at any position between the emission surface R of the planar light L2 and the objective lens 16 and between the imaging lens 17 and the image acquisition unit 6. In addition, for example, in the above-described embodiment, the wedge prism 18 is exemplified as an optical element that corrects astigmatism. However, as such an optical element, in addition to the wedge prism, a cylindrical lens, a toroidal lens, a free curved lens, a diffractive optical element, and the like can also be used.

REFERENCE SIGNS LIST

1: sample observation device, 3: emission optical system, 4: scanning unit, 5: imaging optical system, 6: image acquisition unit, 8: image generation unit, 10: analysis unit, 16: objective lens, 17: imaging lens, 18: wedge prism (optical element), 31: image data, 32: observation image data, L2: planar light, L3: observation light, L3a, L3b: light beam, P2: observation axis, R: emission surface, S: sample, θ: inclination angle.

The invention claimed is:

1. A device, comprising:
   an emission optical system configured to emit planar light to a sample;
   a sample container having a flat bottom surface that is perpendicular to an optical axis of the planar light;
   a scanner configured to scan the sample in one direction so that the sample passes through an emission surface of the planar light;
   an imaging optical system configured to have an observation axis inclined with respect to the emission surface and to form an optical image of observation light generated in the sample by emission of the planar light;
   an image acquisition unit configured to acquire image data corresponding to the optical image of the observation light formed by the imaging optical system; and
   an image generation unit configured to generate observation image data of the sample based on the image data acquired by the image acquisition unit,
   wherein the imaging optical system has a non-axisymmetric optical element configured to bend a light beam on one axis of the observation light but not to bend a light beam on another axis perpendicular to the one axis.

2. The device according to claim 1,
   wherein the optical element is a wedge prism.

3. The device according to claim 1,
   wherein the optical element is a cylindrical lens.

4. The device according to claim 1,
wherein the imaging optical system includes an objective lens, and
the optical element is arranged between the emission surface and the objective lens.

5. The device according to claim 1,
wherein the imaging optical system includes an objective lens, and
the optical element is arranged between the objective lens and the image acquisition unit.

6. The device according to claim 1,
wherein the imaging optical system includes an objective lens and an imaging lens, and
the optical element is arranged between the imaging lens and the image acquisition unit.

7. The device according to claim 1,
wherein the imaging optical system includes an objective lens and an imaging lens, and
the optical element is arranged between the objective lens and the imaging lens.

8. The device according to claim 1,
wherein an inclination angle of the observation axis of the imaging optical system with respect to the emission surface of the planar light is in a range of 10° to 80°.

9. The device according to claim 1,
wherein an inclination angle of the observation axis of the imaging optical system with respect to the emission surface of the planar light is in a range of 20° to 70°.

10. The device according to claim 1,
wherein an inclination angle of the observation axis of the imaging optical system with respect to the emission surface of the planar light is in a range of 30° to 65°.

11. The device according to claim 1, further comprising:
an analyzer configured to analyze the observation image data and to generate an analysis result.

\* \* \* \* \*